(12) United States Patent
Yang

(10) Patent No.: US 6,986,858 B2
(45) Date of Patent: Jan. 17, 2006

(54) METHOD OF MANUFACTURING SUPER-THIN ADVERTISING AND DECORATIVE ZIPPER TAB

(76) Inventor: Shih-Sheng Yang, PO Box 82-144, Taipei (TW)

( * ) Notice: Subject to any disclaimer, the term of this patent is extended or adjusted under 35 U.S.C. 154(b) by 0 days.

(21) Appl. No.: 10/630,672

(22) Filed: Jul. 31, 2003

(65) Prior Publication Data

US 2005/0023726 A1 Feb. 3, 2005

(51) Int. Cl.
  *B29C 45/14* (2006.01)
  *B29C 65/70* (2006.01)
(52) U.S. Cl. ...................... 264/219; 264/254; 264/255; 264/266
(58) Field of Classification Search ................. 264/219, 264/250, 254, 255, 259, 266, 271.1, 274, 264/275; 24/381, 390, 429
See application file for complete search history.

(56) References Cited

U.S. PATENT DOCUMENTS

| | | | | |
|---|---|---|---|---|
| 2,031,959 A | * | 2/1936 | Kelley | 24/413 |
| 2,464,050 A | * | 3/1949 | Morin | 264/252 |
| 2,525,284 A | * | 10/1950 | Camp | 24/401 |
| 2,586,978 A | * | 2/1952 | Murray | 428/67 |
| 2,607,957 A | * | 8/1952 | Danielson et al. | 264/274 |
| 2,920,354 A | * | 1/1960 | Zumbrunnen | 264/28 |
| 2,931,119 A | * | 4/1960 | Gits et al. | 428/66.5 |
| 3,192,566 A | * | 7/1965 | Ryser | 425/117 |
| 3,713,923 A | * | 1/1973 | Laguerre | 156/66 |
| 4,350,656 A | * | 9/1982 | Moertel | 264/166 |
| 4,426,066 A | * | 1/1984 | MacFee | 264/252 |
| 4,427,615 A | * | 1/1984 | Eskesen | 264/261 |
| 5,417,905 A | * | 5/1995 | Lemaire et al. | 264/139 |
| 2001/0001181 A1 | * | 5/2001 | Akashi et al. | 156/66 |

* cited by examiner

*Primary Examiner*—Angela Ortiz
(74) *Attorney, Agent, or Firm*—Leong C. Lei

(57) ABSTRACT

A method of manufacturing a super-thin advertising and decorative zipper tab, comprising the following steps:
  1) casting the first mold with one end of a soft string disposed therein;
  2) providing a sprue on the first mold at a position under the soft string before closing the first mold and injecting plastic to conjunct the soft string within the first molding blank; and
  3) placing the molding blank into a second mold such that a sprue is provided at a position above the soft string before closing the second mold and injecting plastic to conjunct half of the second molding blank with the soft string, in order to manufacture a super-thin advertising and decorative tab.

In the position switch of the respective sprues of the first and second molds, by way of the theory of high pressure generated at the time of injecting plastic into the first mold, the soft string (or bend) can be positioned and integrally combined with the molding blank as desired; and by way of second injection of plastic to conjunct the first and second molding blanks into one completed advertising and decorative zipper tab which tallies with the requirement of a super-thin zipper tab.

4 Claims, 7 Drawing Sheets

METHOD OF MANUFACTURING SUPER-THIN ADVERTISING AND DECORATIVE ZIPPER TAB

FIELD OF THE INVENTION

The present invention relates to a method of manufacturing super-thin advertising and decorative zipper tabs, particularly to a method of manufacturing super-thin advertising and decorative zipper tabs, which, having high tensile strength, are adapted to clothing, backpacks and handbags to increase the aesthetic feeling of said products.

DESCRIPTION OF THE PRIOR ART

Plastic injection process has been commonly adopted by manufacturers of the relevant fields. For injecting plastic to form an article, the most preferred way is providing a sprue on the molding break of the upper and lower molds, as shown in FIG. 1. Regarding the plastic injection process technology of the prior art, when coating an article 10 with plastic decorative block, the most preferred way is providing a sprue 14 on the molding break 13 of the upper mold 11 and lower mold 12, such that a plastic block 15 can be form by the injected plastic.

However, said technology is only applicable to an article of rigid materials. Given the melted plastic liquid is injected into the mold cave by high pressure, if the article 10 to be coated is of soft material, rather then of a material of specific rigidity, it will remove anywhere undesirably and expose outside of the coating plastic block 15, and rendering the whole article an inferior product. As there are high chances of making inferior products in the technology of the prior art, a need exists for seeking improvement.

In view of the above, the inventor has positively researched and produced according to the method of the present invention a super-thin advertising and decorative zipper tab, which, having a good tensile strength, can be used for a long time without being worn out easily.

SUMMARY OF THE INVENTION

The primary object of the invention is to provide a method of manufacturing a super-thin advertising and decorative zipper tab, which, having a good tensile strength, can be used for a long time without being worn out easily.

To obtain the above object, the present invention, including a first mold and a second mold, comprises the following steps:

1) disposing the extending end of a soft string to be conjuncted with the decorative tab through to the first mold;

2) providing a sprue on the first mold at a position under the soft string before closing the first mold and injecting plastic to conjunct the soft string within the first molding blank; and 3) placing the molding blank into a second mold such that a sprue is provided at a position above the soft string before closing the second mold and injecting plastic to conjunct half of the second molding blank with the soft string, in order to manufacture a super-thin advertising and decorative tab.

DETAILED DESCRIPTION OF THE PREFERRED EMBODIMENT

Figure 1:
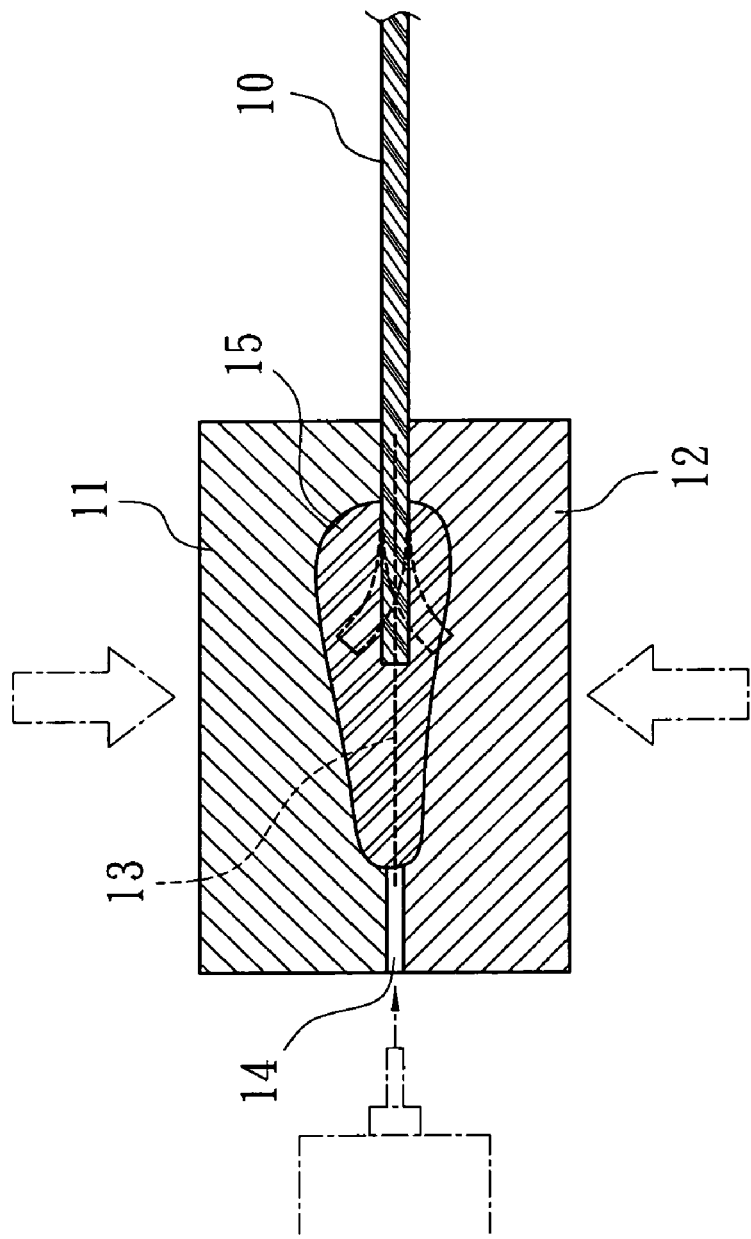
FIG. 1 is a cross-sectional view of an advertising and decorative tab made by plastic injection according to the prior art.
Figure 2:
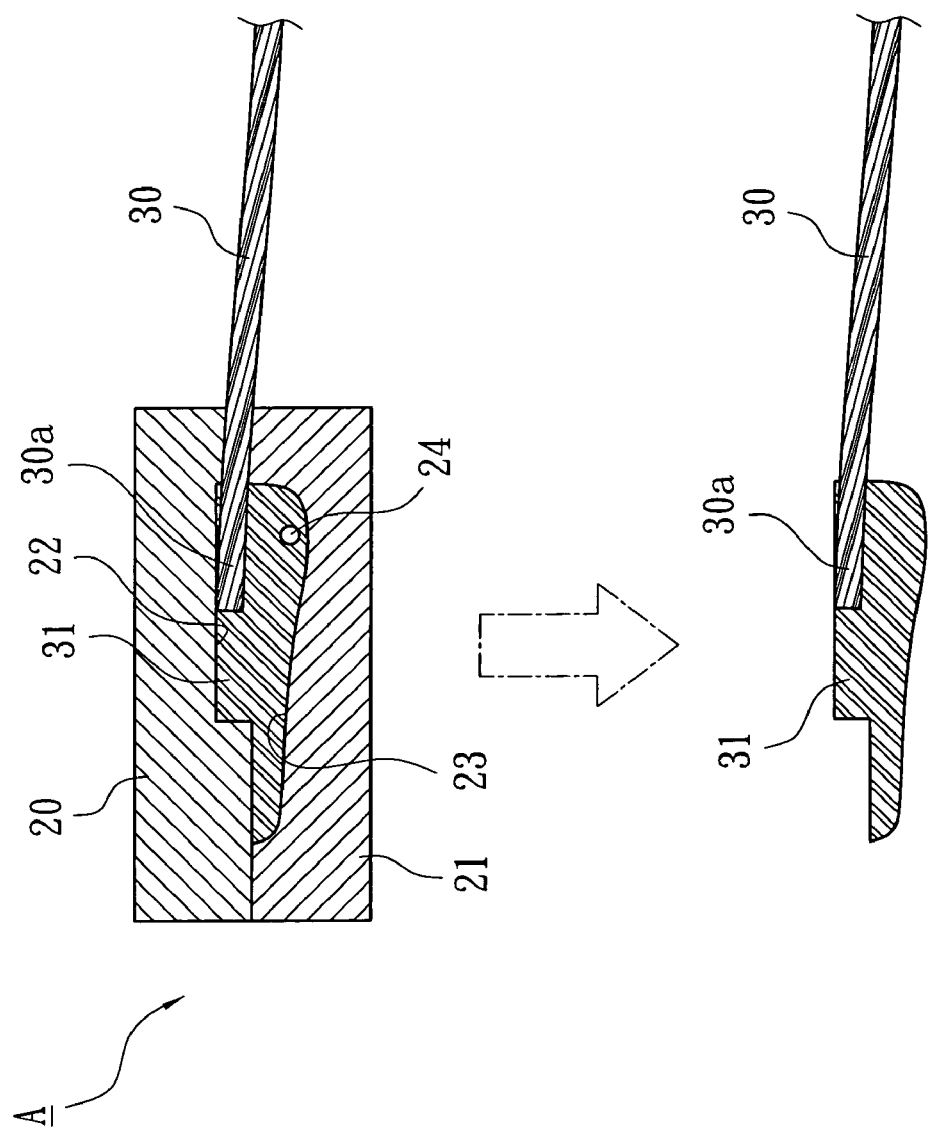
FIG. 2 shows the manufacture of the first mold blank according to present invention.

Referring to FIG. 2, the present invention is provided with a first mold A, which includes an upper mold 20 and a lower mold 21.

Figure 6:
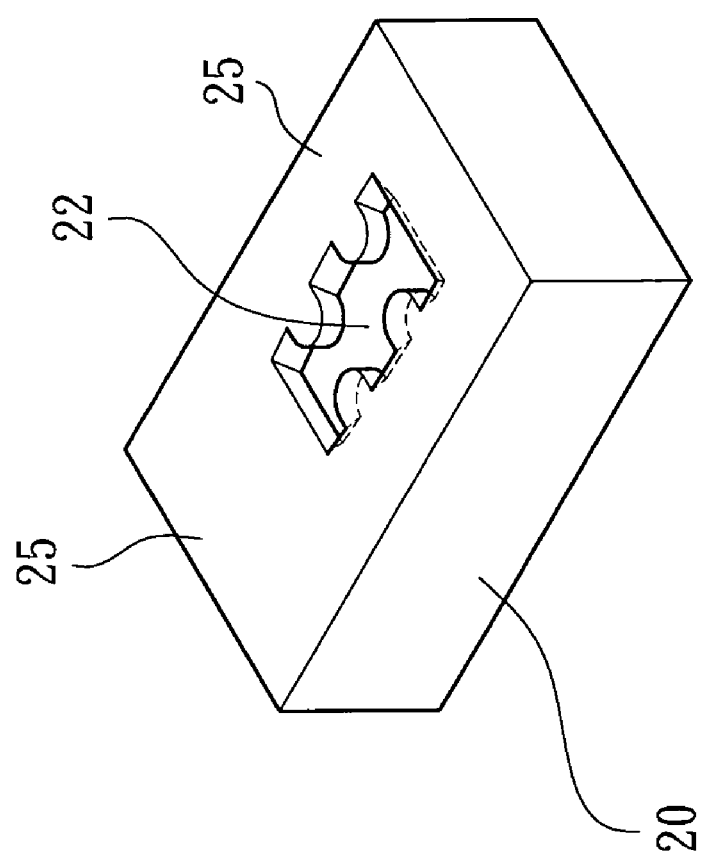
FIG. 6 shows the upper mold of the first mold.

The upper mold 20 is preferably provided in the center a concavity 22 of shallow depression (as shown in FIG. 6), which has a flat rim 25 therearound; whereas the lower mold 21 is provided in the center a concavity 23 of deep depression, on the bottom of which is provided a sprue 24.

Figure 4:
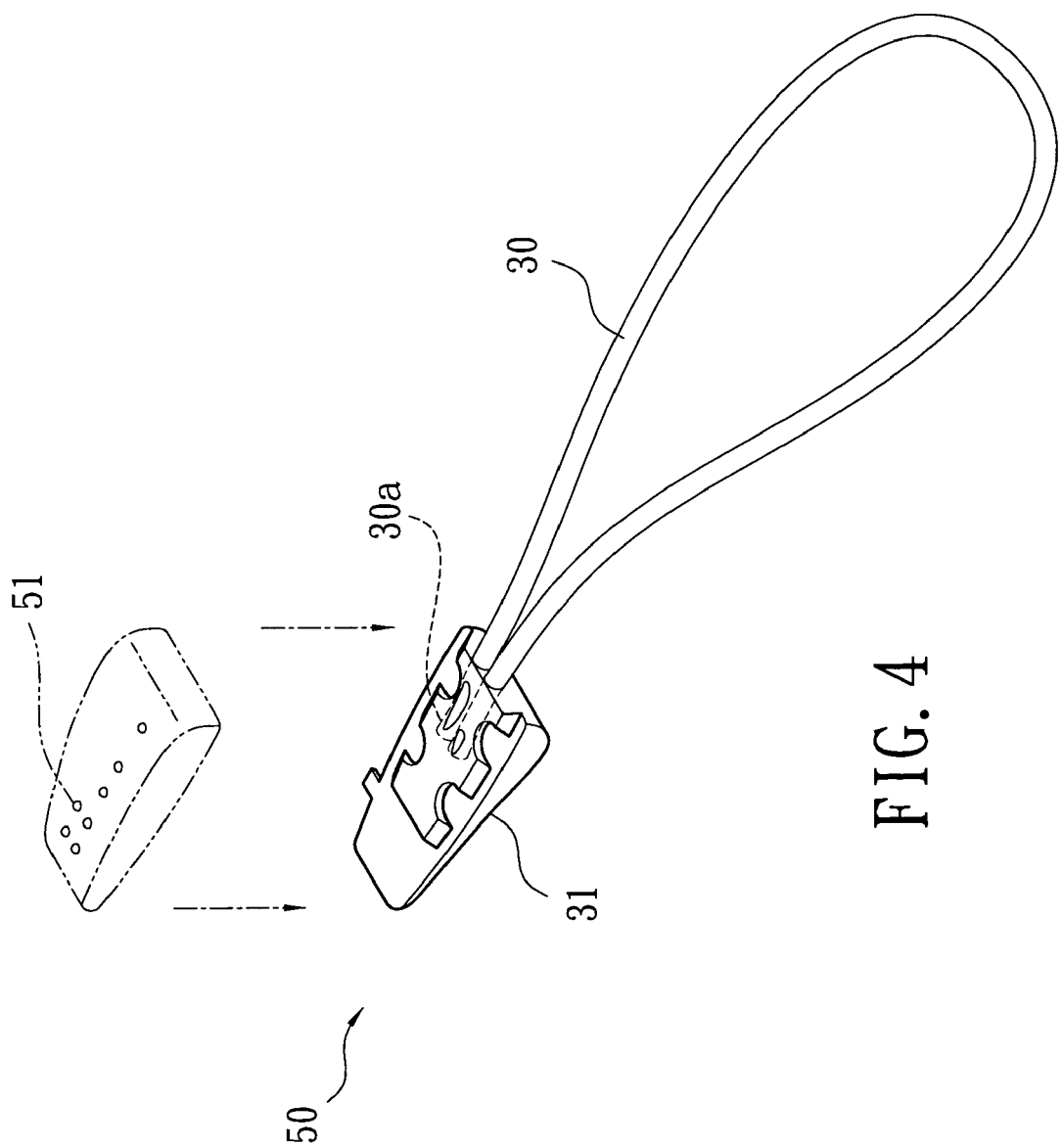
FIG. 4 is an exploded view of the advertising and decorative tab according to the present invention.

After producing the first mold A, the extending end 30a of a soft string 30 is disposed in the first mold A, such that when closing the upper and lower molds and injecting plastic with high pressure into the sprue 24 which is provided at a position under the soft string 30, the plastic injected via high pressure would strike against the soft string 30 (p.s. the soft string actually may be a thin cloth strip or a fine cord, which has been enlarged in the drawings) and squeezed to the central concavity 22 of the upper mold 20 to melt integrally with the soft string 30 to form a molding blank 31 (as shown in FIGS. 2 and 4).

Figure 3:
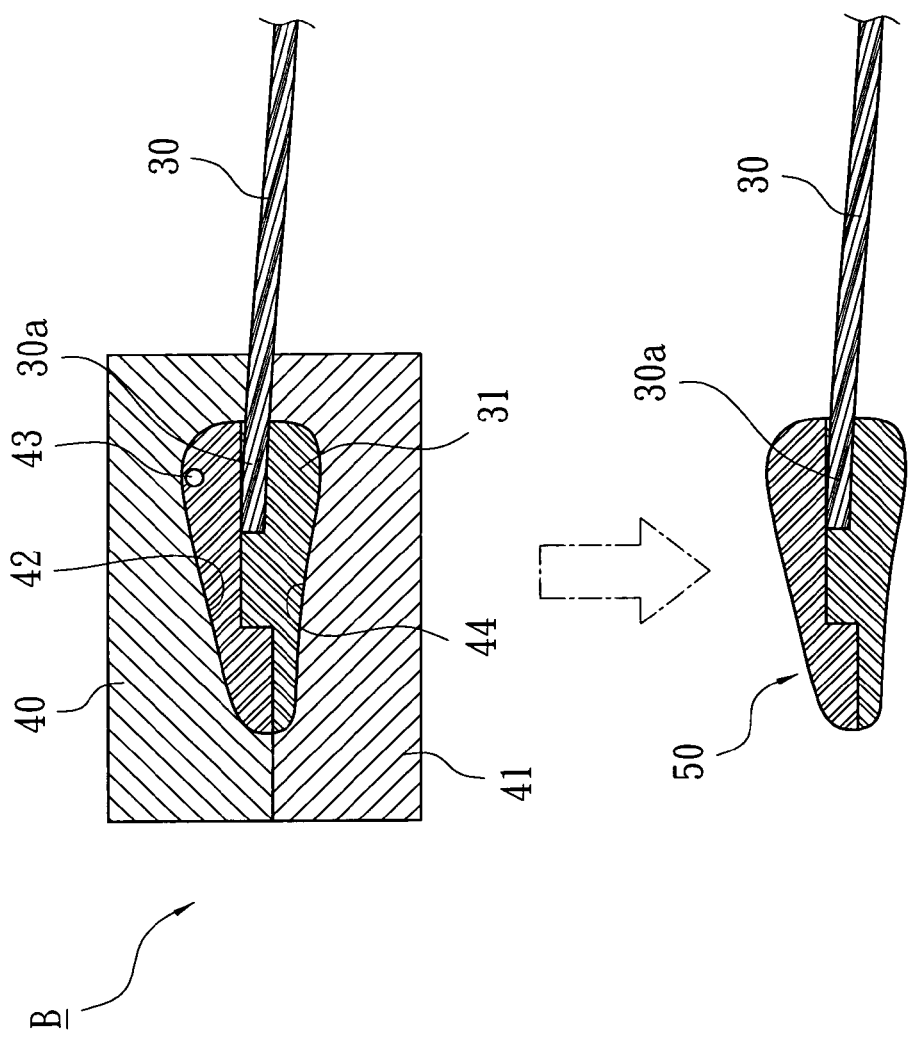
FIG. 3 shows the manufacture of the second mold blank according to present invention.

Referring to FIG. 3, the first molding blank 31 conjuncted with the soft string 30 is disposed in the second mold B, which is composed of an upper mold 40 and a lower mold 41.

The upper mold 40 has a concavity 42, on the bottom of which is provided with a sprue 43. The center of the lower mold 41 is provided with a concavity 44 of the same shape as the molding blank 31, such that the molding blank 31 can be received therein. When closing the second mold B, the plastic material can be injected through the sprue 43 on the bottom of the concavity 42 and cover the soft string 30 exposed on the molding blank 31. After hot melting the molding blank with the plastic material, the soft string is totally wrapped inside to form a super-thin advertising and decorative tab 50.

As show in FIG. 4, a hollow or protruding trademark marking 51 can be formed on the surface of the advertising and decorative tab 50 at the time of forming the molding blank 31 or completing the whole article 50.

Therefore, the product made according to the present invention can serve as a zipper tab and an advertising and decorative tab. The integral thickness of the coated soft string can be controlled to the minimum, i.e. be slightly thicker than the soft string itself, by way of having the bore of the sprue designed to be rather small.

Figure 5:
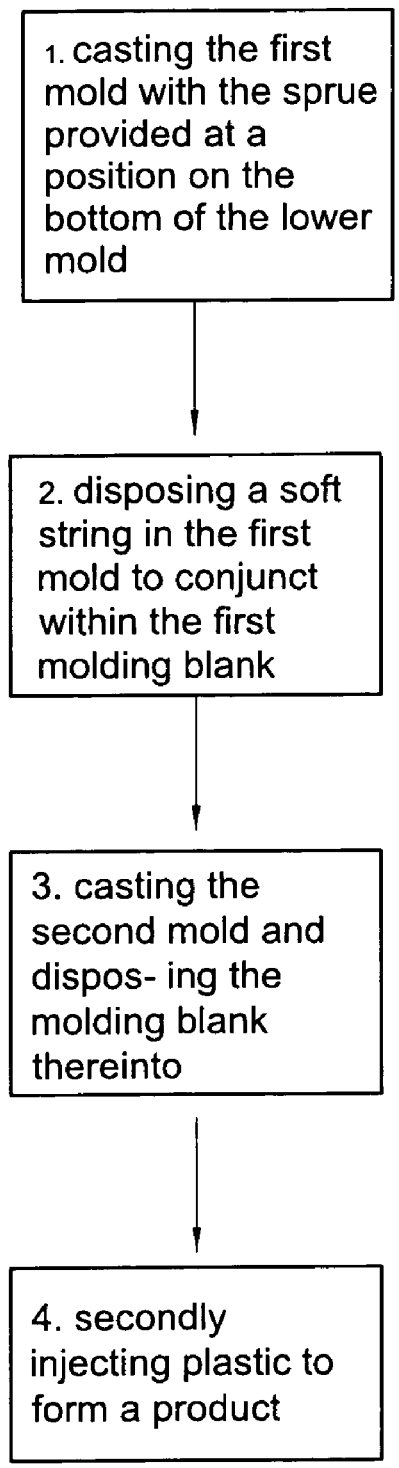
FIG. 5 is a flow chart of the manufacture of the present invention.

Referring to FIG. 5, the present invention comprises the following steps: 1. casting the first mold with the sprue provided at a position on the bottom of the mold; 2. disposing a soft string in the first mold to conjunct within the first molding blank; 3. casting the second mold and disposing the molding blank thereinto; and 4. secondly injecting plastic to form a product. The second time plastic injection can wrap the molding blank wholly or partially.

After the first plastic rejection to conjunct the soft string with the molding blank 31, a further plastic injection in the second mold B can make the integral molding blank 31 wrapped inside only if the concavity 44 of the lower mold 41 is relatively bigger such that when the molding blank 31 is disposed in the concavity 44, the injected plastic can wrap the periphery of the molding blank 31. (* The coverage of the plastic coating depends on the shape and size of the concavity 44.) Meanwhile, color difference can be occurred at the time said plastic coating.

FIG. 6 shows the upper mold 20 of the first mold A, appearing a hollow case 22 provided on the center thereof. There are flat rims 25 around the concavity 22 such that when closing the upper mold 20 with the lower mold 21, the sprue 24 would be at a position below, rather than higher than, the mold break. Accordingly, one end 30a of soft and thin string would be flushed to the center of the concavity 22 by the pressure of the injected plastic material, and combined with the plastic.

Figure 7:
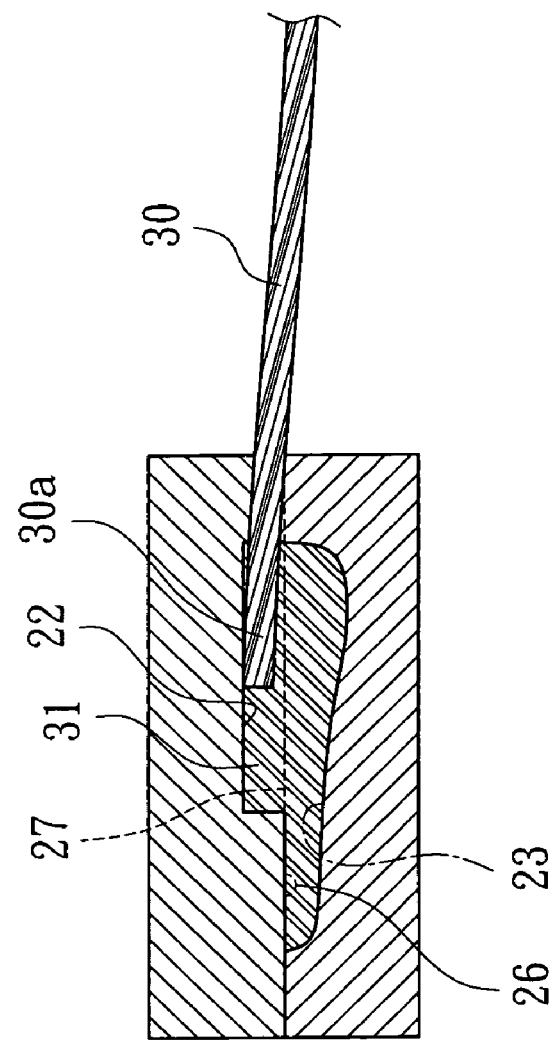
FIG. 7 shows the manufacture of the first mold blank according to another embodiment of the present invention.

Referring to FIG. 7 showing the first mold C of another embodiment according to the invention. As shown, in the first mold C, the sprue 26 of the lower mold 21 is provided at a position very close to but under the mold break 27. Therefore, the sprue 26 should be in a form of a semicircle such that when injecting plastic material into the molds, the pressure of the plastic flushing upwardly from the bottom of the lower mold 21 would push the floating end 30a of the soft string to the concavity 22 of the upper mold 20, and complete a molding blank 31.

In view of the above, the method of manufacturing a super-thin advertising and decorative zipper tab according to the invention has the following advantages in utility:

1. The products are fine quality, and would decrease manufacture cost when being mass-produced.

2. When being applied to certain clothing, the zipper tab made super-thin would appear the vivid characteristics, instead of cumbersome look, of the clothing.

Concluded above, the present invention is adapted to manufacture super-thin advertising and decorative tab, which can enhance the utility of matching certain special clothing.

The above descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

What is claimed is:

1. A method of manufacturing a super-thin advertising and decorative zipper tab, comprising steps of:

casting a first mold, said first mold including an upper mold and a lower mold;

providing one end of a soft string disposed within said first mold and a first sprue on said first mold at a position under said soft string before closing said first mold and injecting plastic to conjunct said soft string to form a first molding blank and melt integrally with the soft string wherein said soft string has a first side uncovered by said plastic; and placing said first molding blank into a second mold shaped to receive the molding blank such that a second sprue is provided at a position above said soft string before closing said second mold and injecting plastic into said second sprue to cover said first side of said soft string and melt with the molding blank in order to manufacture said super-thin advertising and decorative zipper tab.

2. The method of manufacturing a super-thin advertising and decorative zipper tab as claimed in claim 1 wherein said upper mold has a center provided with a concavity around which has a flat rim.

3. The method of manufacturing a super-thin advertising and decorative zipper tab as claimed in claim 1 wherein said first sprue is in form of a semicircle and provided at a position adjacent to a mold break of said upper and lower molds.

4. The method of manufacturing a super-thin advertising and decorative zipper tab as claimed in claim 1 wherein said second mold has a concavity which is larger than said molding blank.

* * * * *